US005621818A

United States Patent [19]

Tashiro

[11] Patent Number: 5,621,818
[45] Date of Patent: Apr. 15, 1997

[54] DOCUMENT RECOGNITION APPARATUS

[75] Inventor: Kiyoshi Tashiro, Kanagawa, Japan

[73] Assignee: Fuji Xerox Co., Ltd., Tokyo, Japan

[21] Appl. No.: 910,377

[22] Filed: Jul. 9, 1992

[30] Foreign Application Priority Data

Jul. 10, 1991 [JP] Japan .................................. 3-195100

[51] Int. Cl.⁶ ...................................................... G06K 9/64
[52] U.S. Cl. ........................................ 382/227; 382/304
[58] Field of Search ................................. 382/34, 1, 25, 382/27, 14, 37, 38, 40, 30, 218, 209, 227, 226, 229, 170, 203, 304

[56] References Cited

U.S. PATENT DOCUMENTS

| 4,410,916 | 10/1983 | Pratt et al. | 382/41 |
|---|---|---|---|
| 4,461,028 | 7/1984 | Okubo | 382/7 |
| 4,542,526 | 9/1985 | Satoh et al. | 382/314 |
| 4,589,142 | 5/1986 | Bednar | 382/37 |
| 4,724,542 | 2/1988 | Williford | 382/3 |
| 4,769,851 | 9/1988 | Nishijima et al. | 382/34 |
| 4,887,303 | 12/1989 | Hongo | 382/34 |
| 4,926,491 | 5/1990 | Maeda et al. | 382/14 |
| 4,987,603 | 1/1991 | Ohnishi et al. | 382/25 |
| 5,034,991 | 7/1991 | Hagimae et al. | 382/30 |
| 5,111,512 | 5/1992 | Fan et al. | 382/3 |
| 5,146,512 | 9/1992 | Weideman et al. | 382/30 |
| 5,265,175 | 11/1993 | Nagaishi | 382/40 |
| 5,278,920 | 1/1994 | Bernzott et al. | 382/40 |
| 5,317,652 | 5/1994 | Chatterjee | 382/10 |
| 5,475,770 | 12/1995 | Mittelbach et al. | 382/181 |

FOREIGN PATENT DOCUMENTS 56-19656  5/1981  Japan .

OTHER PUBLICATIONS

Hagita et al, Handprinted Chinese Characters Recognition by Peripheral Direction Contributivity Feature, Transactions of the Institute of Electronics and Communication Engineers Oct. '83, vol. J66–D, No. 10 pp. 1185–1192.

Tadahiko Kumaamoto et al., On Speeding Candidate Selection In Handprinted Chinese Character Recognition, Pattern Recognition, vol. 24, No. 8, pp. 793–799.

*Primary Examiner*—Michael T. Razavi
*Assistant Examiner*—Larry J. Prikockis
*Attorney, Agent, or Firm*—Finnegan, Henderson, Farabow, Garrett & Dunner, L.L.P.

[57] ABSTRACT

A character recognition apparatus for recognizing characters in a document by sequentially detecting one-character portions of images in a document image and by recognizing the character images of the one-character portions detected. The character recognition apparatus includes a character detecting section for detecting an image of one character from the document image; a character recognizing section for recognizing the detected image of one character and outputting a character code; and a control section for effecting control such that the character image of one character recognized by the character recognizing means is stored in correspondence with the character code obtained as a result of recognition, a comparison is made between the stored character image and the image of a newly detected character, and the character-code stored in correspondence with the relevant character image is read as a result of recognition in a case where the similarity of the images is sufficiently large. Character recognition is effected in which a character image is detected from the document image, the detected character image is recognized, and the character code is outputted, thereby to sequentially recognize a plurality of characters in the document.

13 Claims, 7 Drawing Sheets

FIG. 6(A)
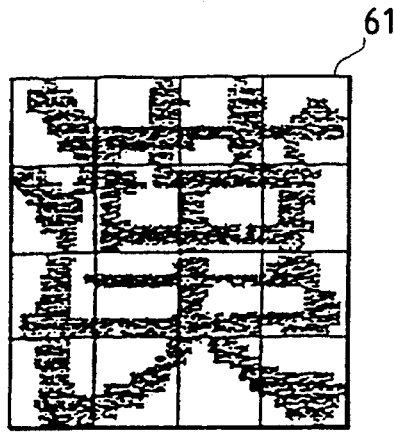
FIG. 6(B)
| 122 | 150 | 135 | 97 |
|---|---|---|---|
| 146 | 158 | 171 | 130 |
| 136 | 113 | 168 | 154 |
| 131 | 100 | 110 | 124 |
FIG. 7
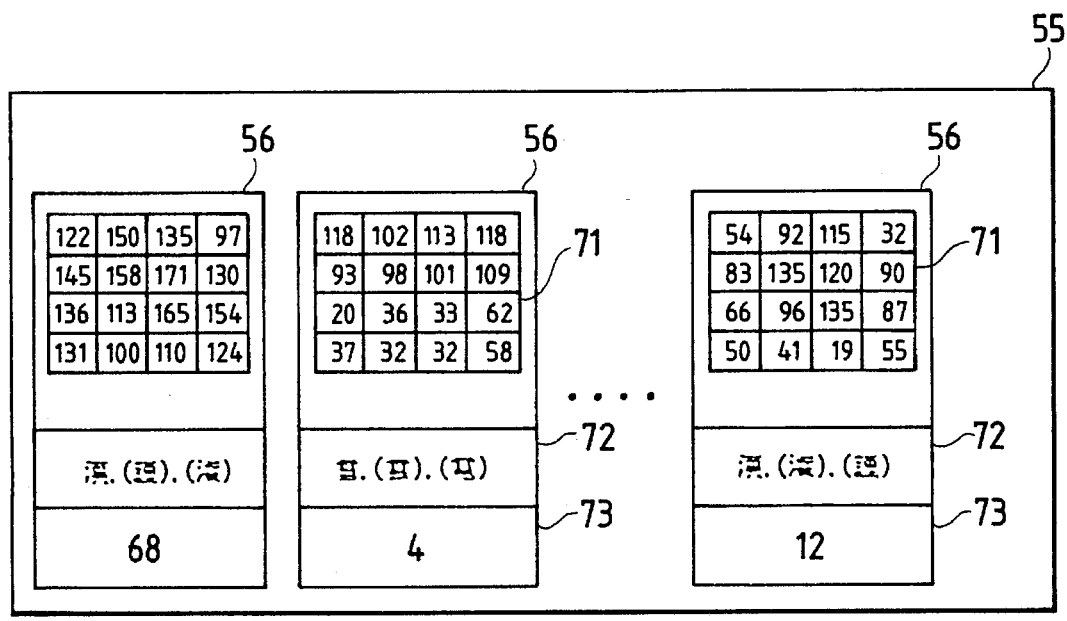

DOCUMENT RECOGNITION APPARATUS

BACKGROUND OF THE INVENTION

1. Field of the Invention

The present invention relates to a document recognition apparatus, and more particularly to a character recognition apparatus for recognizing characters in a document by sequentially detecting one-character portions of images in a document image and by recognizing the character images of the one-character portions detected.

2. Description of the Related Art

Heretofore, document recognition apparatuses to which character recognition devices have been developed as a method of inputting a large volume of documents, ledgers, and the like which are written by sentences in which kanji and kana are mixed. As shown in FIG. 9, the document recognition apparatus comprises a character detecting section 91 for detecting the character image of one character from a document image, a character recognizing section 92 for recognizing the detected character image of one character, and a control section 93 for controlling the character detecting section 91 and the character recognizing section 92. The document recognizing operation in the document recognition apparatus is started as the control section 93 starts the character detecting section 91 and the character recognizing section 92. When the character detecting section 91 detects the character image of one character and supplies the same to the character recognizing section 92, the character recognizing section 92 effects feature extraction processing and recognition processing with respect to the character image of one character, and outputs a character code as a result of recognition. This operation of recognizing one character is repeatedly conducted, and each character in the document image is recognized, thereby effecting document recognition.

FIG. 10 is a block diagram illustrating an example of the configuration of the character recognizing section. To recognize the character images with high accuracy, it is necessary to clearly express the differences between respective characters, and to extract from the image to be recognized those features that are unlikely to be affected by deformations, noise, and the like. For this reason, various kinds of study have hitherto been made. For instance, in a document "Hagita el al., Handprinted Chinese Characters Recognition by Peripheral Direction Contributivity Feature, Transactions of the Institute of Electronics and Communication Engineers Oct. '83, Vol. J66-D, No. 10, pp 1185–1192" a character recognizing system is reported which is capable of effecting character discrimination with high accuracy with respect to handwritten kanji through discrimination processing of a two-stage system for conducting discrimination processing of detailed portions with respect to narrowed-down candidate characters after being classified on the basis of rough-classification features.

In such a two-stage discrimination processing system, as shown in the block diagram of FIG. 10, the configuration of the character recognizing section for effecting character recognition processing is comprised of an image feature normalizing section 101, a rough-classification feature extracting section 102, a rough-classification feature comparing section 103, a rough-classification standard feature storing section 104, a rough-classification sorting section 105, a precise-classification feature extracting section 106, a precise-classification feature comparing section 107, a precise classification standard feature storing section 108, and a precise-classification sorting section 109, so as to effect character discrimination with high accuracy. That is, first, when the image feature normalizing section 101 effects the normalization processing of the image to be recognized, the rough-classification feature extracting section 102 extracts a feature for rough classification. Then, by using the extracted feature for rough classification, the rough-classification feature comparing section 103 effects a comparison with a standard feature stored in the rough-classification standard feature storing section 104. As a result of such a rough-classification comparison, the rough-classification sorting section 105 effects a rough classification. Then, the object of recognition is narrowed down, and the precise-classification feature comparing section 107 performs a comparison with a standard feature stored in the precise-classification standard feature storing section 108. As a result of this comparison with the precise-classification feature, the precise-classification sorting section 109 performs sorting processing.

In addition, in general pattern recognition such as character recognition, a method is also effective in which variations of the objects of the respective features in a feature space are statistically analyzed, and the variations are reflected on the definition of the distance or the similarity. As an example of a pattern recognition apparatus of this type, a pattern recognition apparatus disclosed in Published Examined Japanese Patent Application No. 19656/1981 has been proposed. In this pattern recognition apparatus, the pattern recognition is effected on the basis of the similarity between a standard pattern and an input pattern. In the pattern recognition, M kinds of standard patterns and N kinds of standard patterns perpendicular to the same are prepared in advance as patterns corresponding to standard patterns belonging to a specific class. Then, with respect to an arbitrarily given input pattern, a determination is made of the difference between, on the one hand, the sum of squares of the similarity of M kinds produced between this input pattern and the M kinds of standard patterns, and, on the other hand, similarly the sum of squares of the similarity of N kinds produced with respect to the N kinds of standard patterns. Then, processing is effected in which whether or not the input pattern belongs to the relevant class is determined by whether or not that value becomes a value greater than a predetermined threshold value.

If an attempt is made to discriminate sentences in which kanji and kana are mixed, or general graphic patterns with high accuracy, very complicated recognition processing is required. In order to improve the document recognition apparatus with respect to general printed document, a multiplicity of features which are effective in absorbing the difference between fonts are extracted, and discrimination is effected by using a multiplicity of features. As a result, although much time is required in the recognition processing of one character, the character recognition can be effected virtually reliably.

However, if complicated recognition processing is used to improve the character recognition accuracy, the recognition speed declines, and if, conversely, the processing is simplified to improve the recognition speed, the recognition accuracy deteriorates. Thus, there is the problem that the recognition speed and the recognition accuracy are difficult to improve in a compatible manner.

SUMMARY OF THE INVENTION

The present invention has been devised to overcome the above-described problems, and it is an object of the present invention to provide a document recognition apparatus which substantially improves the overall recognition speed during recognition of a plurality of characters in a document image without sacrificing the character recognition performance whereby characters of various fonts can be recognized with high accuracy.

To attain the aforementioned object, the document recognition apparatus in accordance with the present invention is characterized by being a document recognition apparatus in which a character image is detected from a document image, the detected character image is recognized, and character recognition for outputting a character code is effected so as to sequentially recognize a plurality of characters in the character image, the document recognition apparatus comprising: character detecting means (11) for detecting an image of one character from the document image; character recognizing means (13) for recognizing the detected image of one character and outputting a character code; and control means (16) for effecting control such that the character image of one character recognized by the character recognizing means is stored in correspondence with the character code obtained as a result of recognition, a comparison is made between the stored character image and the image of a newly detected character, and the character code stored in correspondence with the relevant character image is read as a result of recognition in a case where the similarity of the images is sufficiently large.

The document recognition apparatus is characterized by further comprising: character image storing means (14) for storing the character image of one character together with the character code in correspondence with each other; and character image comparing means (12) for determining the similarity between two one-character portions of the character images, wherein the control means (16) effects control such that the character image of one character recognized by the character recognizing means (13) is stored in the character image storing means (14) together with a corresponding character code obtained as a result of recognition, a comparison is made between the already stored character image and the image of a newly detected character by means of the character image comparing means (12), and the character code stored in correspondence with the relevant character image is read as a result of recognition in a case where the similarity of the images is sufficiently large.

Here, the control means (16) is characterized in that only when the assurance of a result of recognition by the character recognizing means (13) is sufficiently large, the control means (16) stores in the character image storing means (14) the relevant character image together with the corresponding character code obtained as a result of recognition.

In addition, the control means (16) is characterized by effecting control such that the character image of one character and the character code obtained as a result of recognition of the relevant character image are stored as one storage unit (15) by being made to corresponding to each other, a comparison is sequentially made between the character image of each storage unit stored and the image of a newly detected character, and the character code corresponding to the stored character image is read as a result of recognition in a case where the similarity of the images is sufficiently large while the character code as a result of recognition by the character recognizing means (13) is outputted in a case where the similarity of the images is not sufficiently large.

Furthermore, the control means (16) is characterized by effecting control such that the character image of one character and the character code obtained as a result of recognition of the relevant character image are stored as one storage unit by being made to corresponding to each other, a comparison is sequentially made between the character image of each storage unit stored and the image of a newly detected character, and the character code corresponding to the stored character image is read as a result of recognition in a case where the similarity of the images is sufficiently large while the character code as a result of recognition by the character recognizing means is outputted in a case where the similarity of the images is not sufficiently large, so as to store as a new storage unit the relevant character image and the character code obtained as a result of recognition such that the character image and the character code correspond to each other.

In this case, frequency information for registering the frequency with which the character code in a relevant storage unit is read is additionally stored in the storage unit (15) for storing the character image of one character together with the corresponding character code obtained as a result of recognition of the relevant character image, and in a case where the storage units exceed a maximum capacity of storage, a storage unit to be detected is determined on the basis of the frequency information on each of the character images subjected to character recognition up until then, and the storage unit including the character image and the character code which are made to correspond to each other is stored newly in the deleted storage unit.

In addition, the document recognition apparatus in accordance with the present invention is characterized by being a document recognition apparatus in which a character image is detected from a document image, the detected character image is recognized, and character recognition for outputting a character code is effected so as to sequentially recognize a plurality of characters in the character image, the document recognition apparatus comprising: character detecting means (51) for detecting an image of one character from the document image; character recognizing means (54) for recognizing the detected image of one character and outputting a character code; simple character image feature extracting means (52) for extracting a simple character image feature from the detected character image; character image feature storing means (55) for storing the simple character image feature extracted from the character image of one character and the character code which are made to correspond to each other; simple character image feature comparing means (53) for determining the similarity between two one-character portions of the simple character image features; and control means (57) for effecting control such that the character code obtained as a result of recognition of the character image recognized by the character recognizing means and the simple character image feature of the relevant character image are stored in the character image storing means by being made to correspond to each other, a comparison is made between the simple character image feature of the relevant character image with respect to the character image of a newly detected character and the simple character image feature stored in the character image feature storing means, and the character code stored in correspondence with the relevant simple character image feature is read as a result of recognition in a case where the similarity of the simple character image features as a result of comparison is sufficiently large.

In addition, in this document recognition apparatus, the control means (57) is characterized in that only when the assurance of a result of recognition by the character recognizing means is sufficiently large, the control means (57)

stores in the character image feature storing means the simple character image feature of the relevant character image together with the corresponding character code obtained as a result of recognition of the relevant character image.

Furthermore, in this document recognition apparatus, the control means (57) is characterized in that the control means effects control such that the simple character image feature of one character and the character code obtained as a result of recognition of the relevant character image are stored in the character image feature storing means as one storage unit by being made to corresponding to each other, a comparison is sequentially made between the simple character image feature of each storage unit stored and the simple character image feature of a newly detected character, and the character code corresponding to the stored simple character image feature is read as a result of recognition in a case where the similarity of the simple character image features is sufficiently large while the character code as a result of recognition by the character recognizing means is outputted in a case where the similarity of the simple character image features is not sufficiently large, so as to store as a new storage unit the relevant simple character image feature and the character code obtained as a result of recognition such that the simple character image feature and the character code correspond to each other.

In this case, frequency information for registering the frequency with which the character code in a relevant storage unit is read is additionally stored in the storage unit (56) for storing the simple character image feature of one character together with the corresponding character code obtained as a result of recognition of the relevant character image, and in a case where the storage units exceed a maximum capacity of storage, a storage unit to be detected is determined on the basis of the frequency information on each of the character images subjected to character recognition up until then, and the storage unit including the simple character image feature and the character code which are made to correspond to each other is stored newly in the deleted storage unit.

In the document recognition apparatus in accordance with the present invention, the character detecting means (11) detects the image of one character in a document image to be recognized, and the character recognizing means (13) recognizes the detected image of one character and outputs a character code. By means of the control section (16), the character image of one character recognized by the character recognizing means is stored by being made to correspond to the character code obtained as a result of recognition, and a comparison is made between the stored character image and a newly detected image of one character. As a result of this comparison, in a case where the similarity of the images is substantially large, control is effected such that the character code stored in correspondence with the relevant character image is read as a result of recognition. As a result, through the simple comparison of the similarity of the character images, the character code of the result of character recognition is obtained without particularly conducting the character recognition processing, with accuracy similar to that in a case where recognition processing is effected.

In addition, in the document recognition apparatus of the present invention, the character detecting means (51) recognizes the detected image of one character. At this time, the simple character image feature extracting means (52) extracts a simple character image feature from the character image detected by the character detecting means (51). The simple character image feature comparing means (53) effects a comparison of simple characters for determining the similarity between two one-character portions of the simple character image features. Stored in the character image feature storing means (55) are the simple character image feature extracted from the character image of one character and the character code of the relevant character image by being made to correspond to each other. The simple character image feature comparing means (53) effects a comparison of similarity between the simple character image feature stored in the character image feature storing means (55) on the one hand, and the simple character image feature extracted from the newly detected character image of one character.

The control means (57) effects control such that the character code obtained as a result of recognition of the character image recognized by the character recognizing means and the simple character image feature of the relevant character image are stored in the character image storing means by being made to correspond to each other, and a comparison is made between the simple character image feature of the relevant character image with respect to the character image of a newly detected character and the simple character image feature stored in the character image feature storing means. In addition, the control means (57) effects control such that the character code stored in correspondence with the relevant simple character image feature is read as a result of recognition in a case where the similarity of the simple character image features as a result of comparison is sufficiently large. Through the above-described operation, the document recognition apparatus effects the processing of document recognition in which a character image is detected from a document image, the detected character image is recognized, and the character recognition for outputting a character code is effected, so as to sequentially recognize the plurality of characters in the character image.

Namely, in the document recognition apparatus of this invention, the following characteristic of a general printed document is utilized. Use is made of the fact that the characters of the same size and the same font are used frequently in individual documents, and there are biases in the characters used in the individual documents. As for the identical characters in a document, since the characters of the same size and the same font are used frequently, the character images themselves are similar. In order to determine whether or not certain two character images are character images representing an identical character, it is sufficient to conduct a comparison of images using the character image itself, or a comparison using a feature extracted very simply, without conducting complicated feature extraction processing and discrimination processing such as character recognition processing.

Whether or a newly detected character image represents the same character as the character image subjected earlier to complicated recognition processing can be determined in a short period of time by conducting a simple comparison of images or a comparison using a feature extracted very simply. For this reason, if the character image as it is after being subjected once to recognition processing, or a feature extracted very simply from that character image is stored in correspondence with the character code obtained as a result of complicated recognition processing conducted earlier, a determination is made as representing an identical character when it can be judged through a simple comparison of similarity that the newly detected character image is sufficiently similar to the character image subjected earlier to recognition processing. Thus, the character code which is the earlier result of recognition can be used as the result of recognition of the newly detected character image. In this case, since the character recognition processing in which complicated feature extraction processing and discrimination processing are conducted can be omitted, so that it is possible to substantially reduce the processing time from the time when the character image is detected until the character code is obtained.

Consequently, the document recognition apparatus of this invention is further provided with the character image storing means (14) for storing the character image of one character together with the character code in correspondence with each other; and the character image comparing means (12) for determining the similarity between two one-character portions of the character images, wherein the control means (16) effects control such that the character image of one character recognized by the character recognizing means (13) is stored in the character image storing means (14) together with a corresponding character code obtained as a result of recognition. In addition, the control means (16) effects control such that a comparison is made between the already stored character image and the image of a newly detected character by means of the character image comparing means (12), and the character code stored in correspondence with the relevant character image is read as a result of recognition in a case where the similarity of the images is sufficiently large.

The characters used in individual documents have biases, and the possibility of specific characters appearing repeatedly is high, so that the proportion by which complicated recognition processing can be omitted becomes very high as the above-described control of recognition processing is performed.

For this reason, only when the assurance of a result of recognition by the character recognizing means (13) is sufficiently large, the control means (16) stores in the character image storing means (14) the relevant character image together with the corresponding character code obtained as a result of recognition. In addition, the control means (16) effects control such that the character image of one character and the character code obtained as a result of recognition of the relevant character image are stored as one storage unit (15) by being made to corresponding to each other, a comparison is sequentially made between the character image of each storage unit stored and the image of a newly detected character, and the character code corresponding to the stored character image is read as a result of recognition in a case where the similarity of the images is sufficiently large while the character code as a result of recognition by the character recognizing means (13) is outputted in a case where the similarity of the images is not sufficiently large.

Furthermore, the control means (16) effects control such that the character image of one character and the character code obtained as a result of recognition of the relevant character image are stored as one storage unit by being made to corresponding to each other, and when a comparison is sequentially made between the character image of each storage unit stored and the image of a newly detected character, the recognition processing is ended by reading the character code corresponding to the stored character image as a result of recognition in a case where the similarity of the images is sufficiently large. It should be noted that if the similarity of the images is not sufficiently large, the character code as a result of recognition by the character recognizing means is outputted, so as to store as a new storage unit the relevant character image and the character code obtained as a result of recognition such that the character image and the character code correspond to each other. As a result, the new character images subjected to complicated recognition processing are sequentially stored by being made to correspond to the respective character codes of the relevant character images obtained as a result of recognition.

Furthermore, in a document to be recognized, in order to make use of the fact that there are biases in the characters used in individual documents, the character images or features extracted simply from the respective character images are stored preferentially with respect to characters whose frequency of appearance is large. As a result, the frequency of omission of recognition processing can be increased as practically as possible with a small storage capacity, thereby improving the overall recognizing speed.

For this reason, frequency information for registering the frequency with which the character code in a relevant storage unit is read is additionally stored in the storage unit (15) for storing the character image of one character together with the corresponding character code obtained as a result of recognition of the relevant character image. Then, in a case where the storage units exceed a maximum capacity of storage, a storage unit to be detected is determined on the basis of the frequency information on each of the character images subjected to character recognition up until then, and the storage unit including the character image and the character code which are made to correspond to each other is stored newly in the deleted storage unit. As a result, although a large storage capacity is required for storing character images, even if the storing section has a limited storage capacity, it is possible to sufficiently improve the recognizing speed.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIGS. 6a and 6b are a diagram illustrating a mesh feature of a simple character image feature;

FIG. 7 is an explanatory diagram illustrating information in each storage unit stored in a character image feature storing section;

DESCRIPTION OF THE PREFERRED EMBODIMENTS

Figure 1:
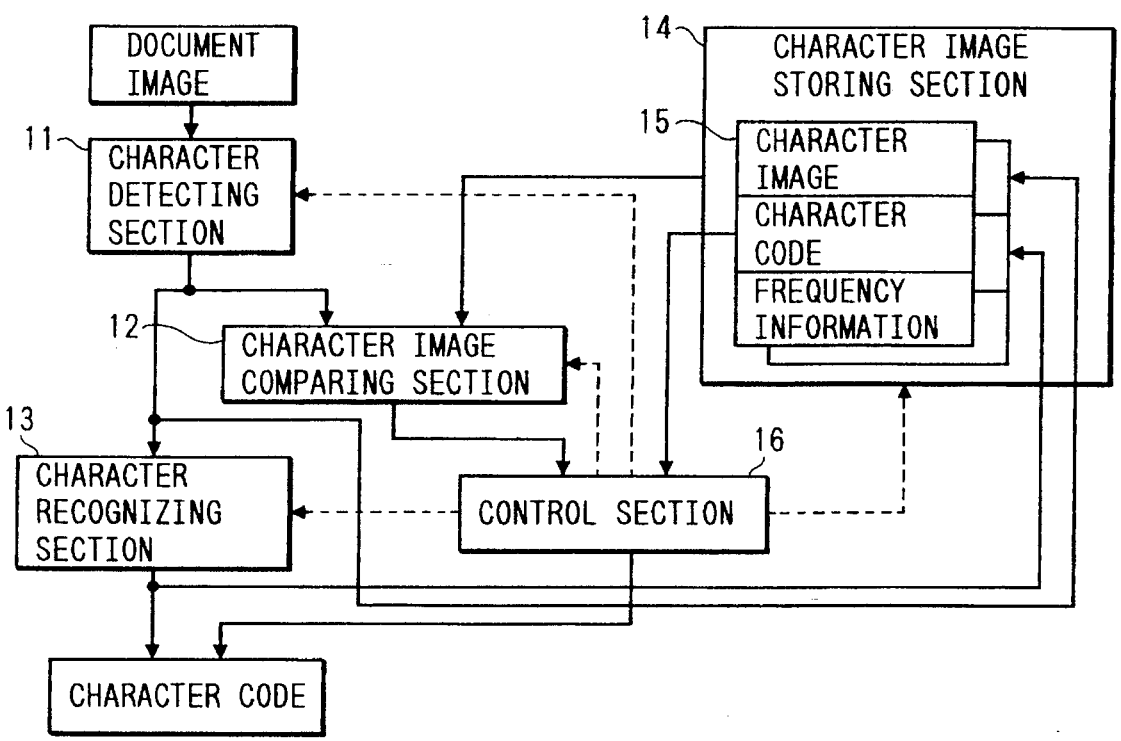
FIG. 1 is a block diagram illustrating an overall configuration of a document recognition apparatus in accordance with a first embodiment of the present invention.

Referring to the drawings, a specific description will be given hereafter of the embodiments of the present invention.

Figure 2:
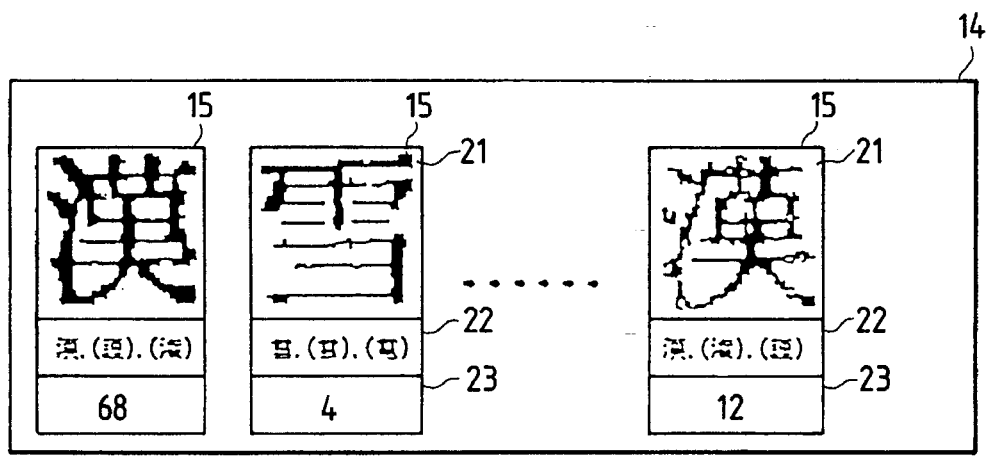
FIG. 2 is an explanatory diagram illustrating information in each storage unit stored in a character image storing section.

FIG. 1 is a block diagram illustrating an overall configuration of a document recognition apparatus in accordance with the present invention. FIG. 2 is an explanatory diagram illustrating information in each storage unit stored in a character image storing section. In FIGS. 1 and 2, reference numeral 11 denotes a character detecting section; 12, a character image comparing section; 13, a character recognizing section; 14, a character image storing section; and 15, a storage unit for storing a character image and a character code which are made to correspond to each other. Frequency information is further stored in each storage unit 15 as additional information. In addition, numeral 16 denotes a control section for controlling the overall document recognition processing. Numeral 21 denotes character image information; 22, character code information; and 23, frequency information.

A description will be given of the overall operation of the document recognition apparatus thus arranged. If a document image, i.e., an object to be recognized, is given, the character detecting section 11 detects the image of one character from the document image, and supplies the character image of one character detected to the document image comparing section 12 and the character recognizing section 13. When the character image of one character is inputted, the character recognizing section 13 effects character recognition processing with respect to the relevant character image, including feature extraction processing, rough-classification processing by means of features for rough classification, and discrimination processing by means of detailed features. The character recognition processing by this character recognizing section 13 is processing in which complicated feature extraction processing and the like are performed so as to effect character recognition processing with high accuracy. Although this character recognition processing requires much processing time, when the character image of one character is given from the character detecting section 11, processing is started, and the processing of character recognition with high accuracy is commenced.

Meanwhile, the already recognized character image is stored in the character image storing section 14 as one storage unit 15 by being made to correspond to a character code obtained as a result of recognition thereof. The character images in the respective storage units 15 which are stored in the character image storing section 14 are sequentially supplied to the character image comparing section 12, which performs a comparison between each of the character images and each of the newly detected character images supplied separately from the character detecting section 11, so as to determine the similarity between the two character images. Since the result of determination of comparison of the similarity by this character image comparing section 12 is obtained sufficiently more speedily than in the processing of the character recognition in the character recognizing section 13, the control section 16 effects control for reading a character code stored in the character image storing section 14, in correspondence with the similarity obtained as a result of determination of comparison of the similarity. Alternatively, the control section 16 effects control for outputting a character code from the character recognizing section 13 without performing reading.

That is, in a case where the similarity of the result of comparison of the character images is sufficiently large, a relevant character code is read from a storage unit stored in the character image storing section 14 in correspondence with a corresponding character image, and is outputted as a result of recognition. Then, an instruction for stopping the processing is issued to the character recognizing section 13 so as to end the character recognition processing with respect to that character image. Subsequently, in order to proceed to the recognition processing of an ensuing character image, the control section 16 sends an instruction for starting the processing of the ensuing character image to the character detecting section 11, the character image comparing section 12, and the character recognizing section 13.

Meanwhile, in a case where the similarity of the images obtained from the character image comparing section 12 is not sufficiently large, the control section 16 does not read a character code from the storage unit in the character image storing section 14, and waits until the recognition processing in the character recognizing section 13 ends and a character code is obtained as a result of recognition. The control section 16 then outputs the character code outputted from the character recognizing section 13 as a result of recognition. Upon completion of the processing by the character recognizing section 13, in order to proceed to the recognition processing of an ensuing character image, the control section 16 sends an instruction for starting the processing of the ensuing character image to the character detecting section 11, the character image comparing section 12, and the character recognizing section 13.

In this case, before starting the processing of the ensuing character image, the control section 16 effects control for storing in the character image storing section 14 the character code obtained from the character recognizing section 13, together with the character image of a one-character portion of the relevant character image, as a new storage unit 15 by causing that character code obtained as a result of recognition to correspond to that character image. Consequently, new character images subjected to complicated recognition processing are sequentially made to correspond to the relevant character codes of the character images, respectively, and are stored in the character image storing section 14.

In the above-described manner, as shown in FIG. 2, the character codes obtained by performing complicated recognition processing by the character recognizing section 13 are each sequentially stored in the character image storing section 14 as one storage unit 15, together with the character image information 21 on one character of the relevant character image such that the character code information 22 obtained as a result of recognition is made to correspond to that the character image information 21. In addition, the character codes in parentheses in the character code information 23 shown in FIG. 2 indicate that character codes of next candidates outputted when character recognition processing was performed are also stored as reference information. Moreover, the character code information 22 stored by being made to correspond to the character image information 21 stored in the storage unit 15 here may be stored in advance without particularly performing character recognition processing with respect to the character image of one character detected and by causing the character code information 22 obtained as a result of correct recognition through human judgment to correspond to that character image.

The frequency information 23 for registering the frequency with which the character code information 22 in the relevant storage unit 15 was read during document recognition processing is additionally stored in the storage unit 15 which is stored in the character image storing section 14, as shown in FIG. 2. For instance, this frequency information 23 is set to a positive number P when the image of one character and the character code are stored newly in its storage unit. In addition, when the character image of one character is detected from the document, and it is determined that the character image of one character thus detected and the character image of one character in that storage unit are sufficiently similar, the frequency information is updated as a positive number Q is added thereto. Furthermore, each time the image of one character is detected from the document image, a negative number R is added to the frequency information 23 in all the storage units. Through these operations, the higher the frequency of appearance of the image of one character up until then and the more recent the appearance of the image of that character, the greater the value of the frequency information.

In a document to be recognized, in a case where there are biases in characters used in individual documents, the character image storing section 14 can increase the frequency of omission of character recognition processing with a small storage capacity, if character images and character codes, with respect to characters whose frequency of appearance shown in the frequency information is high, are stored preferentially as storage units by being made to correspond to each other, and if the image comparison is performed preferentially by the character image comparing section 12. Consequently, the overall processing speed in document recognition processing improves.

The following control is effected as another method of using the frequency information which is stored additionally in such individual storage portions. That is, if there are numerous storage units 15 already stored in the character image storing section 14, and an attempt is made to store a storage unit of a new character image, in the event that the maximum capacity of storage is to be exceeded, storage units to be deleted are determined on the basis of frequency information on the character images subjected to character recognition up until then, and a storage unit in which the character image and the character code are made to correspond to each other is stored newly in the deleted storage unit. As a result, in the documents to be recognized, by making use of the bias characteristic in the characters used in the individual documents, it is possible to increase as much as possible the frequency of omission of recognition processing with a small storage capacity, so that the overall recognition speed improves.

Figure 3:
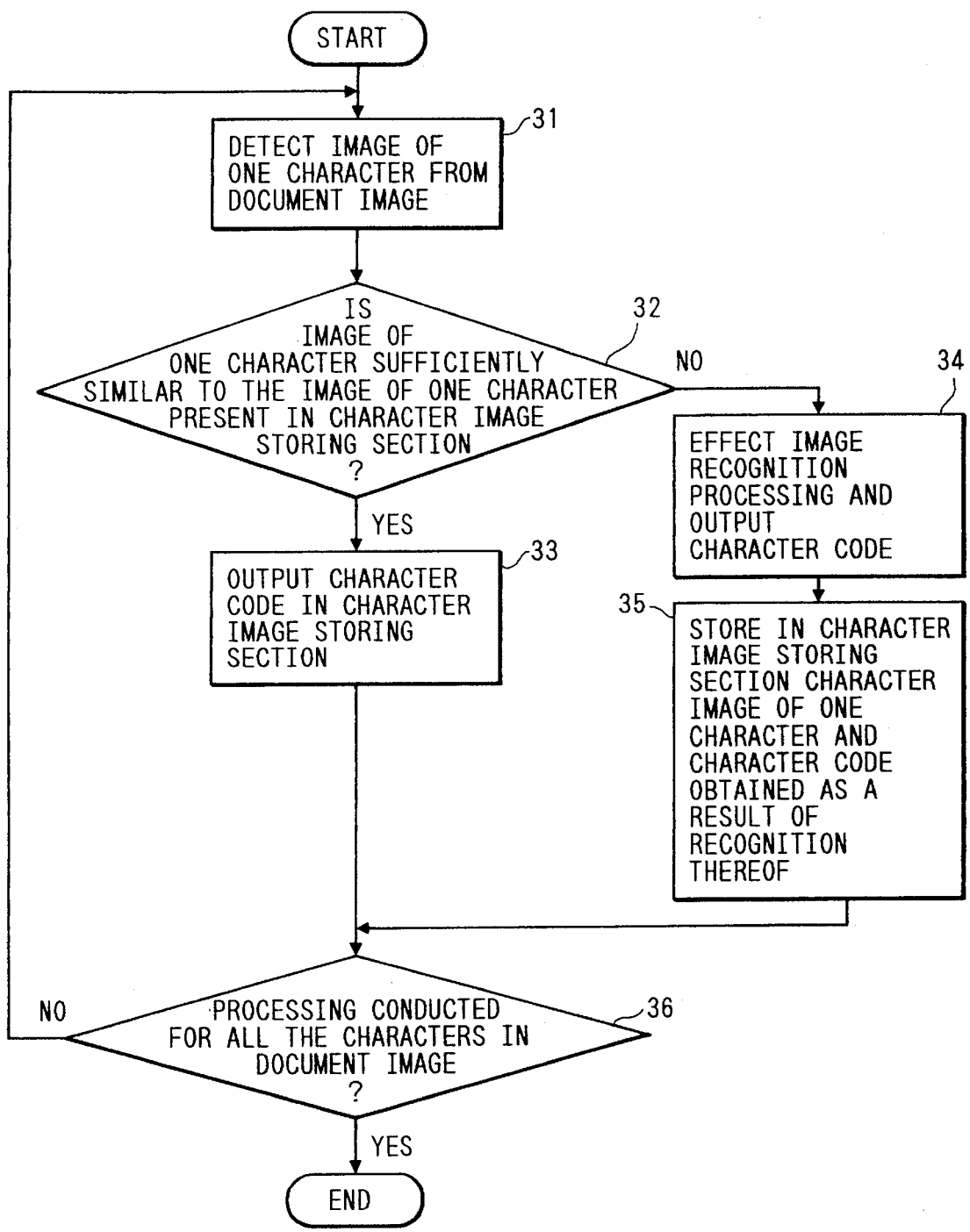
FIG. 3 is a flowchart illustrating a processing flow of document recognition processing controlled by a control section of the document recognition apparatus.

FIG. 3 is a flowchart showing a processing flow of document recognition processing-which is controlled by the control section of the document recognition apparatus. Document recognition processing will be described with reference to FIG. 3. In the document recognition processing here, in Step 31, the image of one character is first detected from the document image by controlling the character detecting section 11. Then, in Step 32, the character image comparing section 12 and the character image storing section 14 are controlled. Specifically, a comparison is made between the character image read from the character image storing section 14 and the detected character image, and a determination is made as to whether or not the image of one character sufficiently similar to the image of one character detected is present in the character image storing section. If a sufficiently similar image of one character is present in the character image storing section, the operation proceeds to processing in Step 33 to read and output the character code stored in the character image storing section 14 by being made to correspond to the relevant character image. Then, the operation proceeds to Step 36 in which a determination is made as to whether or not processing has been performed with respect to all the characters in the document image. This determination as to whether or not any unprocessed character image remains in the character detecting section 41 is made by determining whether or not an undetected character image area remains. If, in this determination, it is determined that processing has not been carried out with respect to all the characters in the document image, the operation returns to Step 31, and the processing starting with Step 31 is repeated.

Meanwhile, if it cannot be determined in Step 32 that the image of one character sufficiently similar to the image of the character detected is present in the character image storing section, the operation proceeds to Step 34 in which the control section 16 controls the character recognizing section 13 to perform the image recognition processing of the character image, and outputs the character code outputted from the character recognizing section 13 as a result of recognition. Then, the operation proceeds to Step 35, in which case the control section 16 controls the character image storing section 14 to store in the character image storing section the character image of one character subjected to recognition processing and the character code obtained as a result of recognition thereof as one storage unit. Then, the operation proceeds to Step 36 to effect the processing of Step 36, as described above.

Such processing is repeatedly performed with respect to the characters in the document image, and upon completion of processing with respect to all the-characters in the document image, the processing of the document image ends. In addition, in the processing (Step 35) in which the control section 16 controls the character image storing section 14 to store in the character image storing section the character image of one character subjected to recognition processing and the character code obtained as a result of recognition thereof as one storage unit, if there are numerous storage units 15 already stored in the character image storing section 14, and an attempt is made to store a storage unit of a new character image, in the event that the maximum storage capacity of the character image storing section 14 is to be exceeded, storage units having a low frequency of appearance are deleted on the basis of the frequency information 23 on the character images stored additionally in the storage unit 15, and storage control is effected in which storage units of character images to be newly stored are stored.

Figure 4:
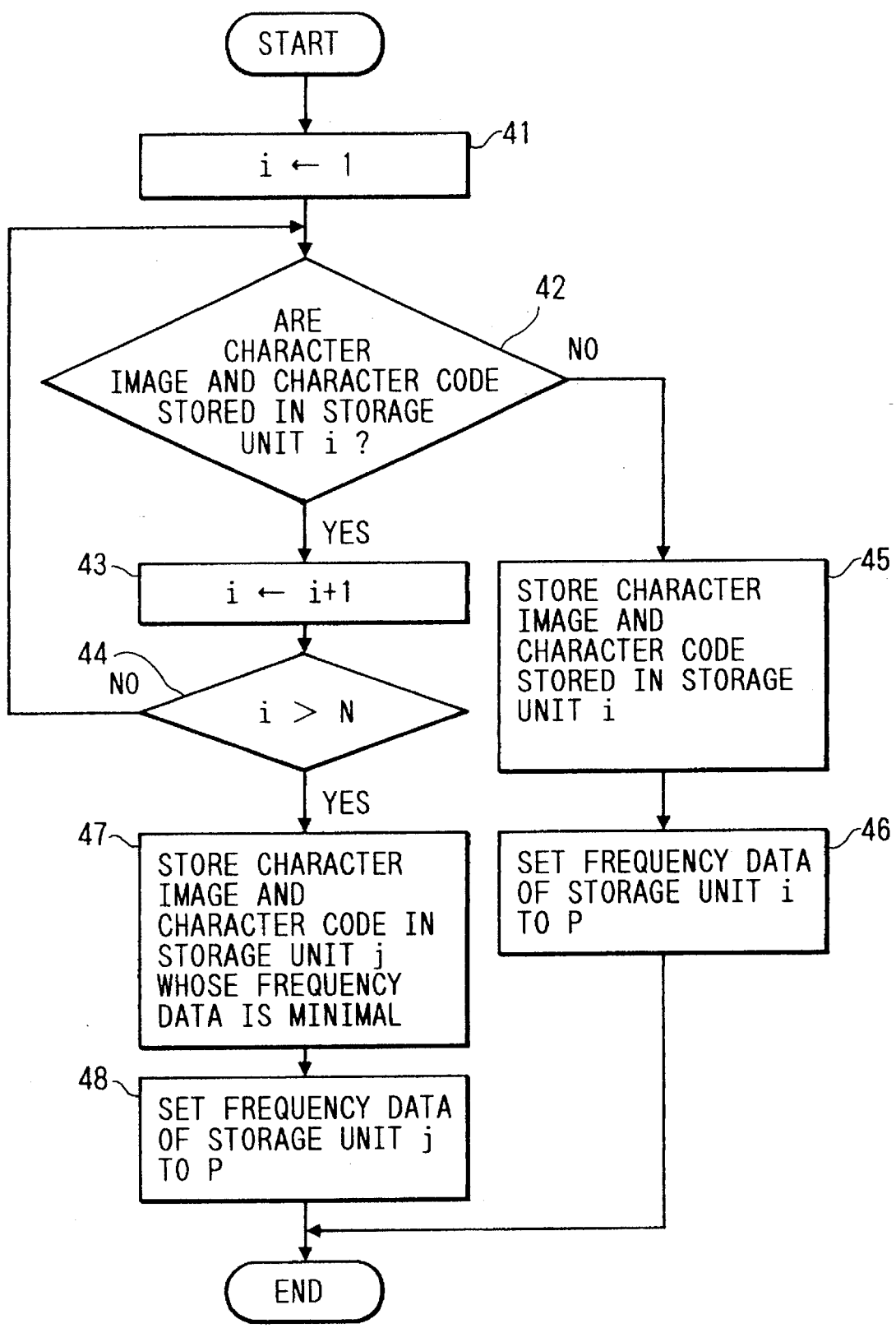
FIG. 4 is a flowchart illustrating an example of storage control processing in which in a case where a storage capacity exceeds a maximum capacity, a storage unit to be deleted is selected and a new storage unit is stored, by using frequency information added to each storage unit of the character image storing section.

FIG. 4 is a flowchart showing an example of storage control processing in which new storage units are stored by selecting the storage units to be deleted in a case where the storage capacity exceeds a maximum capacity, by using the frequency information added to the respective storage units in the character image storing section. Here, the number of storage units that can be stored in the character image storing section is assumed to be N. In this processing, as shown in FIG. 4, in Step 41, an index variable i for designating each storage unit is first initialized to 1. Then, by using this index variable i, a determination is made in Step 42 as to whether or not the character image and the character code are stored in the storage unit i. If the character image and the character code are stored in the storage unit i, the operation proceeds to Step 43 in which, in order to point an ensuing storage unit, 1 is added to the index variable i, thereby updating so as to designate the ensuing storage unit. In an ensuing Step 44, a determination is made as to whether or not the index variable i has exceeded a maximum value N. If the maximum value N has not been exceeded, the operation returns to Step 42 to effect processing again for determining whether or not the character image and the character code have been stored in the storage unit i. This processing is effected repeatedly, and if it is determined in Step 44 that the index variable i which has been sequentially updated has exceeded the maximum value N, the storage units stored in the character image storing section have reached the maximum capacity, so that it is impossible to store a new storage unit including the character image and the character code. For this reason, the operation proceeds to Step 47 in which the previous character image and character code which are stored in a storage unit j whose frequency information is minimal are deleted, and a new character image and a character code of that character image are stored in this storage unit j. Then, in an ensuing Step 48, the frequency information P is set in this storage unit j, and processing ends.

Meanwhile, if it can be determined in the determination processing in Step 42 that the character image and the character code are not stored in the storage unit i, since this storage unit i is in a vacant state, the character image and the character code which are newly stored are stored in that storage unit i. For that reason, the operation proceeds to Step 45 to store the character image and the character code of that character image in the storage unit i. Then, in an ensuing Step 46, the frequency information P is set in this storage unit i, and processing ends.

When an attempt is made to newly store the image of one character and the character code through the above-described storage processing of the storage units, in a case where the image of one character and the character code have already been stored in all of the storage units, the previous character image and character code stored in the storage unit whose frequency information is minimal are deleted, and storage processing is effected in which a new character image and a character code of that character image are stored in this storage unit. Through this method of storing storage units, the character image expressing a character whose frequency of appearance is higher and which has appeared more recently remains preferentially in the character image storing section 14. In the document, since the character whose frequency of appearance is higher and which has appeared more recently has a higher probability of appearance, so that storage units each comprising a character image and a character code of a high probability, which can be used during the recognition of ensuing characters, can be stored in the character image storing section.

Since the comparison of character images which is conducted in the character image comparing section is sufficient if a rough comparison of matching is performed between the character image subjected earlier to character recognition and the character image newly detected. Hence, even if a comparison is performed using a very simple feature of the character image extracted from the character image, the similarity can be determined sufficiently. For instance, the comparison of the image features may be effected by dividing the character image by a coarse mesh and by setting average densities of mesh areas as a feature of the character image. By so doing, the comparison processing of character image features can be effected at high speed, thereby making it possible to improve the processing speed of document recognition processing as a whole. An embodiment of a document recognition apparatus using such simple character image features will be described hereafter.

Figure 5:
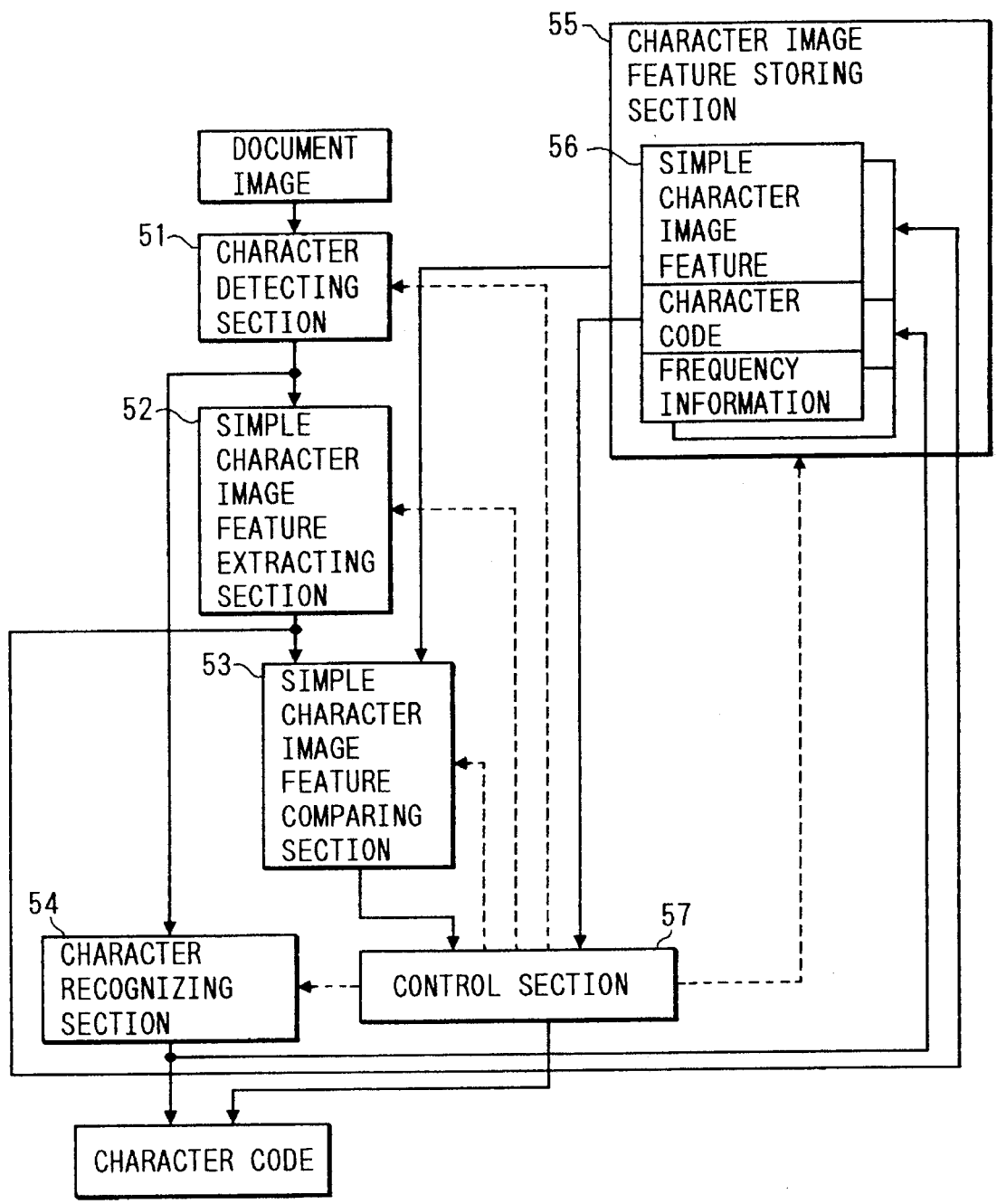
FIG. 5 is a block diagram illustrating an overall configuration of a document recognition apparatus in accordance with a second embodiment of the present invention.

FIG. 5 is a block diagram showing an overall configuration of a document recognition apparatus in accordance with a second embodiment of the present invention. FIG. 6 is a diagram illustrating a mesh feature of a simple character image feature. FIG. 7 is an explanatory diagram illustrating information in each storage unit stored in a character image feature storing section. In FIG. 5, reference numeral 51 denotes a character detecting section; 52, a simple character image feature extracting section; 53, a character image comparing section; 54, a character recognizing section; and 55, a character image feature storing section. Numeral 56 denotes a storage unit for storing a simple character image feature and a character code which are made to correspond to each other, and frequency information is further added to each storage unit 55 as additional information and is stored therein. In addition, numeral 57 denotes a control section for controlling the overall document recognition processing using simple character image features.

A description will be given of the overall operation of the document recognition apparatus thus arranged. If a document image, i.e., an object to be recognized, is given, the character detecting section 51 detects the image of one character from the document image, and supplies the character image of one character detected to the simple character image feature extracting section 52 and the character recognizing section 54. When the character image of one character is inputted, the character recognizing section 54 starts character recognition processing with-respect to the relevant character image, including feature extraction processing, rough-classification processing by means of features for rough classification, and discrimination processing by means of detailed features. The character recognition processing by the character recognizing section 54 is complicated processing such as ordinary pattern recognition processing, and is processing which requires much processing time. When the character image of one character is given from the character detecting section 51, processing is started, and the processing of character recognition with high accuracy is commenced.

Meanwhile, when the character image of one character detected from the character detecting section 51 is supplied thereto, the simple character image feature extracting section 52 extracts a simple character image feature of the mesh feature such as the one shown in FIG. 6, and sends the same to the simple character image feature comparing section 53. In addition, the simple character image feature extracted from the already recognized character image and a character code obtained as a result of recognition of that character image are stored in the character image feature storing section 55 as one storage unit 56 by being made to correspond to each other, and frequency information being further added to and stored in each storage unit 56. The simple character image features in the respective storage units 56 which are stored in the character image feature storing section 55 are sequentially supplied to the simple character image feature comparing section 53, which performs a comparison between each of the simple character image features and each of the newly detected simple character image features supplied separately to the simple character image feature comparing section 53 from the simple character image feature extracting section 52. Then, the similarity between the two simple character image features is determined by the simple character image feature comparing section 53. Since the result of determination of comparison of the similarity by this simple character image feature comparing section 53 is obtained sufficiently more speedily than in the processing of the character recognition in the character recognizing section 54, the control section 57 effects control for reading a character code stored in the character image feature storing section 55, in correspondence with the similarity obtained as a result of determination of comparison of the similarity. Alternatively, the control section 57 effects control for outputting a character code from the character recognizing section 54 without performing reading.

In a case where the similarity of the result of comparison of the simple character image features is sufficiently large, a relevant character code, which is stored by being made to correspond to the relevant simple character image feature in the character image feature storing section 45, is read and outputted as a result of recognition. Then, in that case, an instruction for stopping the processing is issued to the character recognizing section 54 so as to end the character recognition processing with respect to that character image. Subsequently, in order to proceed to the recognition processing of the character image, the control section 57 sends an instruction for starting the processing of an ensuing character image to the character detecting section 51, the simple character image feature comparing section 53, and the character recognizing section 54. In addition, the instruction for starting the processing of the ensuing character image is also sent to the character recognizing section 54.

Meanwhile, in a case where the similarity as a result of the comparison of the simple character image features is not sufficiently large, the control section 57 does not read a character code from the storage unit 56 in the character image feature storing section 55, and waits until the recognition processing in the character recognizing section 54 ends and a character code is obtained as a result of recognition. The control section 57 then outputs the character code outputted from the character recognizing section 54 as a result of recognition. Then, upon completion of the processing by the character recognizing section 54, in order to proceed to the recognition processing of an ensuing character image, the control section 57 sends an instruction for starting the processing of the ensuing character image to the character detecting section 51, the simple character image feature extracting section 52, the simple character image feature comparing section 53, and the character recognizing section 54.

In this case, before starting the processing of the ensuing character image, the control section 57 effects control for storing in the character image feature storing section 55 the character code obtained from the character recognizing section 54, together with the simple character image feature extracted from that character image, as a new storage unit 56 by causing that character code obtained as a result of recognition to correspond to that simple character image feature. Consequently, new character codes of new character images obtained by effecting complicated recognition processing with high accuracy over a long period of time are sequentially made to correspond to the relevant simple character image features, respectively, and are stored in the character image feature storing section 14.

The simple character image feature used here is feature data in which, as shown in FIG. 6(A), with respect to a character image 61 of one character, the character image is divided by a coarse mesh, and the average image densities of the divided mesh area portions are set as feature parameters. As a result, the simple character image feature is set as a mesh feature 62 having 4×4 feature parameters, as shown in FIG. 6(B). As for the simple character image feature of such a mesh feature 62, simple character image feature information 71 and character code information 72 corresponding thereto are stored in the character image feature storing section 55 as one storage unit 56, as shown in FIG. 7. In the same way as in the foregoing embodiment, further added to this storage unit 56 is frequency information 73 for recording the frequency with which the character code information 72 in that storage unit 56 was read during the document recognition processing through control by the control section 57.

In a document to be recognized, in a case where there are biases in characters used in individual documents in the same way as in the foregoing embodiment, the frequency information 73 stored here is used to store the simple character image feature and the character code as a storage unit by causing them to correspond to each other preferentially with respect to the character whose frequency of appearance is high. As a result, characters whose frequency of appearance is high are preferentially subjected to the comparison of similarity by the simple character image feature comparing section 53. Thus, the character image feature storing section 55 is capable of increasing the frequency of omission of character recognition processing with a small storage capacity. In this case, the overall processing speed in document recognition processing also improves.

In addition, the following control is effected as another method of using the frequency information 63 which is thus stored additionally in the individual storage units 56. That is, if there are numerous storage units 56 already stored in the character image feature storing section 55 for storing the simple character image features, and an attempt is made to store a new storage unit, in the event that the maximum capacity of storage is to be exceeded, storage units to be deleted are determined on the basis of frequency information on the character images which appeared during character recognition up conducted until then, and a storage unit in which the character image and the character code are made to correspond to each other is stored newly in the deleted storage unit. As a result, in the documents to be recognized, it is possible to make use of the bias characteristic in the characters used in the individual documents, and it is possible to increase as much as possible the frequency of omission of recognition processing with a small storage capacity.

Figure 8:
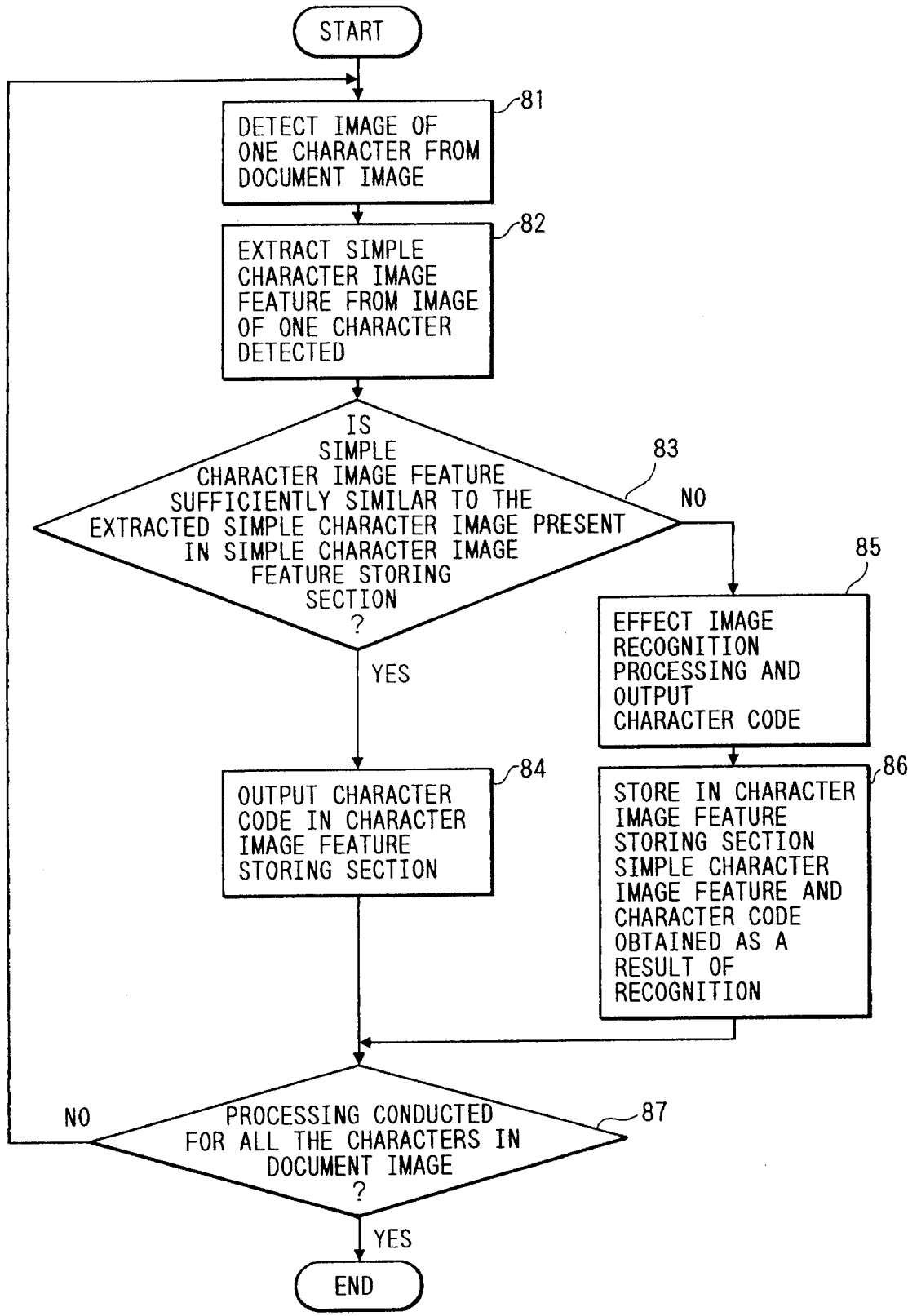
FIG. 8 is a flowchart illustrating a processing flow of document recognition processing controlled by the control section of the document recognition apparatus in accordance with the second embodiment.
Figure 9:
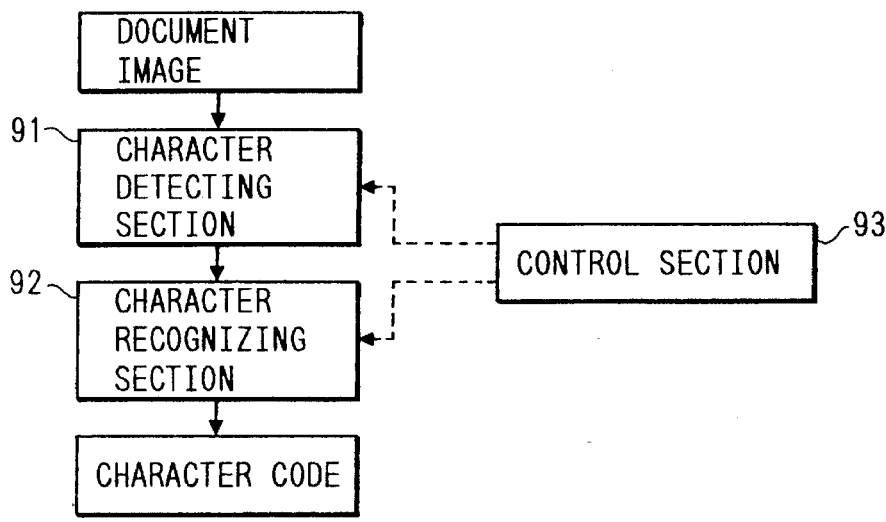
FIG. 9 is a block diagram illustrating an overall configuration of the document recognition apparatus.
Figure 10:
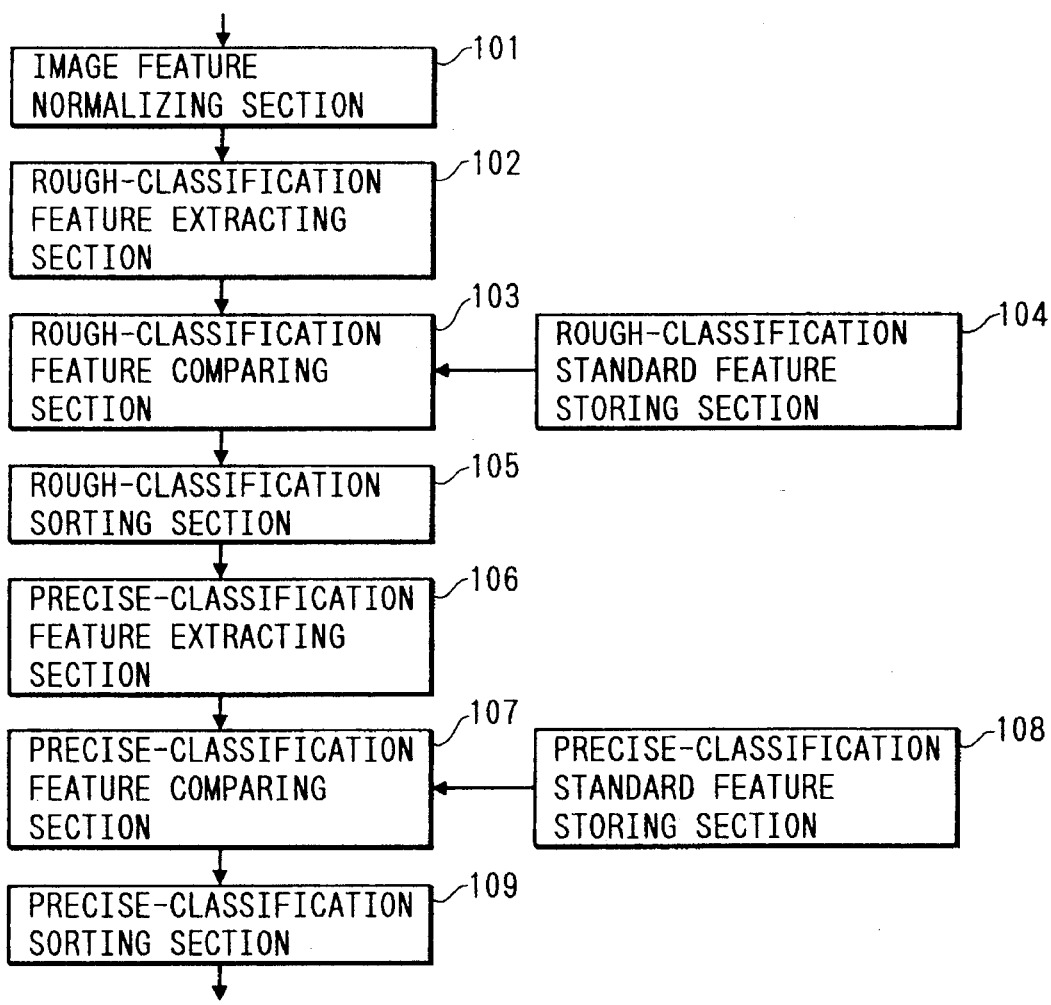
FIG. 10 is a block diagram illustrating a detailed configuration of each portion of a character recognizing section.

FIG. 8 is a flowchart showing a processing flow of document recognition processing which is controlled by the control section of the document recognition apparatus in accordance with the second embodiment. Document recognition processing will be described with reference to FIG. 8. In the document recognition processing here, in Step 81, the image of one character is first detected from the document image by controlling the character detecting section 51. Then, in Step 82, the simple character image feature extracting section 52 is controlled, and the simple character image feature is extracted from the image of the detected character. Subsequently, the operation proceeds to Step 83 to control the simple character image feature comparing section 53 and the character image feature storing section 55. Specifically, a comparison is made between the simple character image feature read from the character image feature storing section 55 and the simple character image feature extracted from the detected character image, and a determination is made as to whether or not a simple character image feature sufficiently similar to the extracted simple character image feature is present in the character image feature storing section. If a sufficiently similar simple character image feature is present in the character image feature storing section, the operation proceeds to processing in Step 84 to read and output the character code stored in the character image feature storing section 55 by being made to correspond to the relevant simple character image feature. Then, the operation proceeds to Step 87 in which a determination is made as to whether or not processing has been performed with respect to all the characters in the document image. This determination as to whether or not any unprocessed character image remains in the character detecting section 51 is made by determining whether or not an undetected character image area remains. If, in this determination, it is determined that processing has not been carried out with respect to all the characters in the document image, the operation returns to Step 81, and the processing starting with Step 81 is repeated.

Meanwhile, if it cannot be determined in the determination processing in Step 83 that a simple character image feature sufficiently similar to the extracted simple character image feature is present in the character image feature storing section, the operation proceeds to Step 85 in which the control section 57 controls the character recognizing section 54 to perform the image recognition processing of the character image, and outputs the character code outputted from the character recognizing section 54 as a result of recognition. Then, the operation proceeds to Step 86, in which case the control section 57 controls the character image feature storing section 55 to newly store in the character image feature storing section the character code obtained as a result of recognition of the character image of one character subjected to recognition processing and the simple character image feature extracted from that character image as one storage unit. Then, the operation proceeds to Step 87, and in Step 87 which is similar to the one described above, a determination is made as to whether or not processing has been effected with respect to all the characters in the document image. If it is determined that processing has not been effected with respect to all the characters in the document image, the operation returns to Step 81, and the processing starting with Step 81 is repeated.

Such processing is repeatedly performed with respect to the characters in the document image, and upon completion of processing with respect to all the characters in the document image, the processing of the document image ends. In the document image recognition apparatus of this second embodiment, the simple character image feature extracted from the character image is used instead of the character image of one character in the first embodiment. This simple character image feature is stored together with a corresponding character code, and the comparison of the simple character image features is conducted. Here, although a mesh feature is used as the simple character image feature, another feature may be used. Since this simple character image feature is sufficient if the matching and comparison between the character image of one character already processed and a newly detected character image can be performed with high accuracy, so that an arrangement may be provided such that square forms are extracted from the character image, the number of the square forms is used as the simple character image feature, and a comparison of the number of the square forms is performed. Furthermore, still another feature may be utilized.

Next, a description will be given of modifications of various sections with respect to the embodiments of the present invention. When an attempt is made to utilize the results of recognition of the characters already processed, if a previous recognition result is erroneous, that error will be repeated. To avoid this, an arrangement is provided such that the assurance at the time when the character image of one character is recognized is defined, and only when it is greater than a predetermined threshold value, the character image (or the simple character image feature) is stored in the character image storing section (or the simple character feature storing section).

As the definition of the assurance, the reciprocal of a distance between the feature extracted from the inputted character image of one character and the standard feature of a recognition candidate. The fact that this assurance is sufficiently large means that the feature extracted from the inputted image of one character and the standard feature of the recognition candidate are sufficiently close, and the probability of the recognized result being erroneous becomes small. In addition, the similarity between features may be used as another definition of assurance. As still another definition of assurance, it is possible to use such as a ratio of a distance to a second candidate to a distance to a first candidate.

In addition, although, in the description of the foregoing embodiments, a specific description has not been given of the details of character recognition processing performed by the character recognizing section since they are not related to an essential portion of the present invention, it suffices if character recognition processing with high recognition accuracy which has hitherto been developed is used. In other words, any recognition processing is applicable insofar as the recognition processing makes it possible to input a character image and output a character code as a result of recognition. In addition, this character recognition processing need not necessarily be processing for recognizing the character image of a one-character portion, and may be processing for simultaneously recognizing a plurality of characters. In this case, the character code which is outputted by the character recognizing section and is stored in the character image storing section or the simple character image feature storing section may be a plurality of character codes with respect to the character image of a one-character portion. The processing in which the character image of the one-character portion is stored in correspondence with a plurality of character codes and one character code is selected from the plurality of character codes may be effected by effecting discrimination by making use of the grammatical nature of the language such as words and clauses on the basis of the character codes of the context of the document being consecutively subjected to character recognition. In addition, the character codes may be internally defined codes in addition to the ASCII codes, JIS codes, and the like.

In addition, the frequency information which is added to the storage unit for storing the character image or the simple character image feature is not limited to the one described above, and may be based on another method of determination for expressing a numerical value in which the subsequent probability of appearance of each character is estimated from the previous state of appearance of each character.

Furthermore, although in the foregoing embodiments a description has been given of a case where characters to be subjected to document recognition, in particular, are used as objects to be recognized, the present invention is similarly applicable to pattern recognition processing in which the same pattern appears a plurality of times.

In the above, although a specific description has been given of the present invention on the basis of a plurality of embodiments, the present invention is not limited to these embodiments, and it goes without saying that various modifications are possible within a scope which does not depart from a gist thereof.

As described above, in accordance with the document recognition apparatus of the present invention, the following control is performed: The character image of one character recognized by the character recognizing section is stored together with a corresponding character code obtained as a result of recognition. A comparison is made between the character image thus stored and the image of a newly detected character. If the similarity of the images is sufficiently large as a result of this comparison, the character code stored in correspondence with that character image is read as a result of recognition. For this reason, particularly in a case where the character image which has already been subjected to recognition processing appears again, the character code is obtained at high speed only by the read processing of the character code obtained as a result of recognition, through the comparison of similarity of simple character images without conducting complicated processing of character recognition. In this case as well, the character code is obtained as a result of character recognition with accuracy similar to the case where ordinary recognition processing is carried out. Accordingly, the document recognition apparatus is capable of improving the overall recognition speed in the document recognition processing without reducing the recognition accuracy.

What is claimed is:

1. A document recognition apparatus in which character images are detected from a document image to be recognized, and character recognition for outputting a character code is effected so as to sequentially recognize a plurality of different characters, said document recognition apparatus comprising:

character detecting means for detecting character images;

character recognizing means for processing, when activated, each detected character image to generate a corresponding character code during a first time interval commencing from the activation to the generation of the character code, said character recognizing means includes means for outputting the generated corresponding character code at the end of the first time interval;

character comparing means for comparing, when activated, each detected character image with a stored character image during a second time interval commencing from activation until the reading of the character code corresponding to the stored character image, said character comparing means includes means for reading the character code corresponding to the stored character image in response to a favorable character image comparison, and means for outputting the read character code corresponding to the stored character image at the completion of the second time interval; and control means for activating the character recognizing means and the character comparing means at substantially the same time for processing the same detected character image, said control means including means for storing each recognized character image together with its corresponding character code, and means responsive to the outputting of a character code for deactivating one of the character recognizing and character comparing means to discontinue the corresponding process prior to the completion of one of the first and second time intervals.

2. A document recognition apparatus as defined in claim 1 wherein when said character recognizing means recognizes a character image with a preset assurance, said storing means stores the recognized character image together with the corresponding character code.

3. A document recognition apparatus as defined in claim 1 wherein the character code corresponding to the stored character image is read as a result of the favorable character image comparison when the comparing means indicates that the similarity of the images meets a predefined threshold, and the character code as a result of recognition by said character recognizing means is outputted when the comparing means indicates that the similarity of the images does not meet a predefined threshold.

4. A document recognition apparatus as defined in claim 1 wherein the storing means stores a character image and the corresponding character code as a storage unit, the comparing means compares the character image of each storage unit and the image of a newly detected character, the reading means reads the character code corresponding to the stored character image as a result of the favorable character image comparison in the case where the similarity of the images meets a predefined threshold, and the storing means stores the recognized character image and the corresponding character code where the similarity of the images does not meet a predefined threshold.

5. A document recognition apparatus as defined in claim 4 wherein frequency information for registering the frequency with which a character code stored as a storage unit is read is stored with the storage unit and at times when the storage means exceeds a maximum capacity of storage, one storage unit is deleted from the storage means on the basis of the frequency information.

6. A document recognition apparatus as defined in claim 1 wherein the control means activates the character comparing means only at times when there is at least one character image stored in correspondence with a character code.

7. A document recognition apparatus as defined in claim 1 wherein the character code is independent of the size of the image of the character.

8. A document recognition apparatus in which kanji or kana character images are detected from a document image to be recognized, and character recognition for outputting a character code is effected so as to sequentially recognize a plurality of characters, said document recognition apparatus comprising:

character detecting means for detecting character images;

simple character image feature extracting means for extracting a simple character image feature from the detected character image;

character recognizing means for processing, when activated, each detected character to generate a character code corresponding to the extracted simple character image feature during a first time interval commencing from the activation to the generation of the character code, said character recognizing means includes means for outputting a character code corresponding to the extracted simple character image feature at the completion of the first time interval;

character comparing means for comparing, when activated, the stored simple character image feature with the extracted simple character image feature during a second time interval commencing from activation until the reading of the character code corresponding to the stored simple character image feature, said character comparing means including means for reading the character code corresponding to the stored simple character image feature, and means for outputting the character code corresponding to the stored simple character image feature in response to a favorable comparison at the end of the second time interval; and control means for activating at substantially the same time for processing of the same character image the character recognizing means in response to each character image detected, and a character comparing means in response to each extracted simple character image feature from the character image, said control means including means for storing each simple character image feature together with its corresponding character code, and means responsive to the outputting of a character code for deactivating one of the character recognizing and character comparing means to discontinue the corresponding process prior to the completion of one of the first and second time intervals.

9. A document recognition apparatus as defined in claim 8 wherein the control means activates the character comparing means only at time when there is at least one simple character image feature stored in correspondence with a character code.

10. A document recognition apparatus as defined in claim 8 wherein the character code is independent of the size of the image of the character.

11. A document recognition apparatus as defined in claim 8 wherein when said character recognizing means recognizes a character image with a preset assurance, said character image feature storing means stores the simple character image feature of the recognized character image together with the corresponding character code obtained as a result of recognition of the recognized character image.

12. A document recognition apparatus as defined in claim 8 wherein the simple character image feature of a recognized character and the corresponding character code are stored in said simple character image feature storing means as a storage unit, a comparison is sequentially made between the simple character image feature stored as a storage unit and the simple character image feature of a newly detected character, the reading means reads the character code corresponding to the stored simple character image feature as a result of the favorable character image comparison in the case where the similarity of the simple character image features meets a predefined threshold, the reading means reads the character code recognized by said character recognizing means in a case where the similarity of the simple character image features does not meet a predefined threshold, and the storing means stores the recognized simple character image feature and the corresponding character code where the similarity of the images does not meet a predefined threshold.

13. A document recognition apparatus as defined in claim 8 wherein frequency information for registering the frequency with which a character code stored is a storage unit is read is stored with the storage unit, and if the storing means exceeds a maximum capacity of storage, one storage unit is deleted from the storing means on the basis of the frequency information.

* * * * *